United States Patent [19]
Yanagawa et al.

[11] Patent Number: 6,075,759
[45] Date of Patent: Jun. 13, 2000

[54] OPTICAL INFORMATION RECORDING AND REPRODUCING APPARATUS

[75] Inventors: Naoharu Yanagawa; Fumihiko Sano; Hiroshi Suzuki; Shinji Suzuki; Yasumitsu Suzuki; Masanori Nakahara, all of Tokorozawa, Japan

[73] Assignee: Pioneer Electronic Corporation, Tokyo-to, Japan

[21] Appl. No.: 09/006,223

[22] Filed: Jan. 13, 1998

[30] Foreign Application Priority Data

Jan. 14, 1997 [JP] Japan .................................. 9-004945

[51] Int. Cl.⁷ ...................................................... G11B 7/00
[52] U.S. Cl. ............................................ 369/44.18; 369/97
[58] Field of Search ............................... 369/44.18, 44.19, 369/44.37, 44.14, 44.17, 44.32, 44.22, 112, 97

[56] References Cited

U.S. PATENT DOCUMENTS 5,617,391  4/1997  Ono et al. ............................ 369/97 X
5,673,245  9/1997  Yanagawa et al. .................... 369/97 X Primary Examiner—Muhammad Edun
Attorney, Agent, or Firm—Young & Thompson

[57] ABSTRACT

An optical record medium has an information record surface on which a plurality of circular arc tracks are arranged such that centers of the circular arc tracks are arranged in a straight line direction. An apparatus for optically recording and reproducing information onto and from the optical record medium is provided with: a rotatable optical system for emitting a light beam onto the circular arc track of the optical record medium which is being moved straight in the straight line direction, while being rotated with an rotational axis perpendicular to the information record surface; a straight moving device for relatively moving the rotatable optical system and the optical record medium to each other in the straight line direction; a detecting device for detecting a displacement amount from the circular arc track at an irradiated position on the information record surface of the light beam, on the basis of a reflection light from the circular arc track of the light beam, and outputting a displacement amount signal indicating the detected displacement amount; a perpendicularly moving device for relatively moving the optical record medium and the rotatable optical system to each other perpendicularly to the straight line direction such that the irradiated position approaches the circular arc track, on the basis of the outputted displacement amount signal; and a recording and reproducing device for recording and reproducing the information onto and from the optical record medium by use of the light beam emitted to the circular arc track.

11 Claims, 12 Drawing Sheets

Bm: MAIN BEAM
Bs1, Bs2: SUB-BEAM

23~25 : DIFFERENTIAL AMP

OPTICAL INFORMATION RECORDING AND REPRODUCING APPARATUS

BACKGROUND OF THE INVENTION

1. Field of the Invention

The present invention relates to an optical information recording and reproducing apparatus for recording and reproducing information onto and from an optical record medium in a form of a tape or a card.

2. Description of the Related Art

There is an optical disk as a record medium for recording and reproducing an audio signal and an image signal. Although a high record density can be attained by the optical disk, an area which can be used for the recording operation is rather small. Thus, when considering a whole disk, there is a certain limit in a memory capacity thereof.

On the other hand, a record medium in a form of a tape, such as a magnetic tape used for VTR (Video Tape Recorder) and the like, is inferior in the record density to the optical disk. However, it is possible to record the information onto the record medium in the form of the tape, in the amount of approximately 100 times as much as that of the optical disk in respect of the record capacity.

Hence, a record medium, which is compact and has a large record capacity, can be attained by combining the high record density of the optical disk with the large record capacity of the record medium in the form of the tape.

Therefore, for example, it is researched to perform the recording or reproducing operation of the information by applying a laser light to the optical record medium in the form of the tape (hereafter, it is referred to as an "optical tape") in which a magneto-optical record film, such as TbFeCo and the like, is formed on a base film in the similar manner as in the magnetic tape An optical record medium in the form of the card having the above mentioned magneto-optical record film as the optical record medium (hereafter, it is referred to as an "optical card") in the similar manner as in the optical tape is also researched. The optical card may be used in a particular field such as a management of a medical chart and the like.

FIG. 11 shows a schematic configuration of one example of an optical information recording and reproducing apparatus for recording and reproducing information onto and from the optical tape or the optical card in the above mentioned related art.

As shown in FIG. 11, an optical information recording and reproducing apparatus 100 is provided with: a signal processor 106 for signal-processing an external input signal Si to be recorded and then converting it into a record signal Sr to thereby output it to a stationary optical system 105, and further signal-processing a reproduction signal Sp from the stationary optical system 105 to externally output it as an output signal So; the stationary optical system 105, which has a light beam emitting device for emitting a light beam B (a light beam for recording) to record information onto an optical card 1 (or an optical tape) when recording the information, on the basis of the record signal Sr, and further emitting a light beam B (a light beam for reproducing) when reproducing the information, and also has a light receiving device for receiving a reflection light from the optical card 1 (or the optical tape) of the light beam B (the light beam for reproducing) when reproducing the information to thereby output the reproduction signal Sp; a rotatable optical system 104 for collecting on the optical card 1 (or the optical tape) the light beam B (the light beam for recording) emitted from the stationary optical system 105 when recording, and further guiding to the stationary optical system 105 the reflection light of the light beam B (the light beam for reproducing) from the optical card 1 (or the optical tape) when reproducing, while it is being rotated with a straight line perpendicular to a record surface of the optical card 1 (or the optical tape) as a central axis; and a magnet (not shown) for applying a magnetic field to the optical card 1 (or the optical tape) when recording and reproducing the information.

Among them, the rotatable optical system 104 is provided with: reflection mirrors 102 and 103 for forming an optical path of guiding to an objective lens 101 the light beam B (the light beam for recording) emitted from the stationary optical system 105 when recording, and further guiding to the stationary optical system 105 the reflection light of the light beam B (the light beam for reproducing) from the optical card 1 (or the optical tape) when reproducing; and the objective lens 101 for collecting on the record surface of the optical card 1 (or the optical tape) the light beam B. Then, the rotatable optical system 104 which integrates the reflection mirrors 102 and 103, and the objective lens 101 in one body, is rotated by a drive device (not shown) with the straight line perpendicular to the record surface of the optical card 1 (or the optical tape) as a rotational axis.

The information is recorded by the optical information recording and reproducing apparatus 100 having the above mentioned configuration when recording the information, while circular information tracks TR are being sequentially formed on the optical card 1 (or the optical tape). When reproducing the information, the information recorded on the information tracks TR is read out by the light beam B (the light beam for reproducing) emitted so as to track the information track TR.

The reason why the circular arc information track TR is formed as mentioned above when recording and reproducing the information by using the optical card 1 (or the optical tape) is to improve the record density of the information.

If using the optical information recording and reproducing apparatus 100 as explained above, it is possible to record the information with a high record density on the optical card 1 (or the optical tape) and further reproduce the recorded information to thereby perform the recording and reproducing operation for a large amount of the information, which uses the optical card and is superior in the compactness of the hardware (for further information, refer to "Super Large Capacity Of Optical Tape Record" and "VIEW" edited by NHK, Vol. 13, No. 1 (1994) and the like).

On the other hand, as another example of the optical information recording and reproducing apparatus using the optical card, there is an optical information recording and reproducing apparatus, in which a plurality of straight information tracks are formed in parallel to each other on the optical card, and the light beam is emitted to one of the information tracks while the optical card is being moved in parallel to the information track, and thereby the information is recorded and reproduced (a so-called "reciprocating type" of an optical information recording and reproducing apparatus). In the reciprocating type, when the recording and reproducing operation of the information is ended for one of the information tracks, an optical pickup for emitting the light beam is moved in the direction perpendicular to the information track, and then the recording and reproducing operation of the information is performed for a next adjacent information track.

When recording and reproducing the information by using the optical beam in any of the above mentioned cases, it is necessary to perform a so-called tracking control in which the light beam is emitted so as to track the information track formed on the record surface. As a method used in the recording and reproducing operation of the optical record medium for the tracking control, for example, a so-called three-beam method or a push-pull method is used, in which an objective lens is driven in a tracking direction to thereby cause a light beam to track the information track.

In the optical information recording and reproducing apparatus 100 shown in FIG. 11, for example, when considering a case of reproducing the information recorded on the information tracks TR of the optical card 1 (or the optical tape), as shown in FIG. 12A, if a straight line connecting the centers of the respective information tracks TR (each of which has a circular arc shape) and a locus of a central axis of a rotation of the rotatable optical system 104 (i.e. the locus of the central axis on the optical card 1 (or the optical tape) associated with a movement of the optical card 1 (or the optical tape)) are parallel to each other with an eccentricity shown in FIG. 12A, the locus of the light beam B associated with the rotation of the rotatable optical system 104 is displaced or shifted with respect to each of the information tracks TR.

As shown in FIG. 12B, even if the relation between the straight line connecting the centers of the respective circular arc information tracks TR and the locus of the central axis of the rotation of the rotatable optical system 104 is not parallel to each other, the locus of the light beam B associated with the rotation of the rotatable optical system 104 is displaced or shifted with respect to each of the information tracks TR.

In this way, the above mentioned tracking control is required for these cases. However, for example, a tracking displacement at the end of one information track TR may be larger than that at the center thereof, as shown in FIG. 12A, and there may be such a case that thee tracking displacement cannot be compensated only by driving the objective lens 101 in the tracking direction.

Moreover, in the reciprocating type of the optical information recording and reproducing apparatus, for example, if the optical card is placed obliquely to a moving direction thereof and then the information is recorded and reproduced, the tracking displacement at the end of the one straight information track may be larger than that at the center thereof, and there may be also such a case that the tracking displacement cannot be compensated only be driving the objective lens contained in the pickup in the tracking direction.

When the tracking displacement cannot be compensated only be driving the objective lens in the tracking direction as mentioned above, the tracking displacement may be compensated by moving the optical pickup portion itself, which emits the light beam, in the radial direction (i.e. the tracking direction) of the optical disk. However, in the optical information recording and reproducing apparatus 100 shown in FIG. 11, the directions in which the tracking displacements are compensated (the tracking directions) are different at the respective portions of one information track TR (refer to arrows in FIG. 12A). Thus, in order to move the rotatable optical system 104 to the tracking direction so as to compensate the tracking displacement, there are necessary a complex hardware structure and a complex control to move the rotatable optical system 104 in various directions corresponding to the rotation thereof. This results in a problem that the above mentioned hardware structure and control are actually nearly impossible.

Similarly in the reciprocating type of the optical information recording and reproducing apparatus, the distances in which the tracking displacements are compensated are also different at the respective portions of one information track TR. Thus, in order to move the pickup to the tracking direction so as to compensate the tracking displacement, there is also a problem that the complex hardware structure and control are required.

SUMMARY OF THE INVENTION

The present invention is proposed in view of the above mentioned problems. It is therefore an object of the present invention to provide an optical information recording and reproducing apparatus using an optical card or an optical tape, which can exactly record and reproduce information by enabling a light beam to exactly track an information track, even if a tracking displacement becomes too large to compensate the displacement only by driving the objective lens.

The above object of the present invention can be achieved by a first apparatus for optically recording and reproducing information onto and from an optical record medium having an information record surface on which a plurality of circular arc tracks, on each of which the information is recorded and from each of which the information is reproduced, are arranged such that centers of the circular arc tracks are arranged in a straight line direction. The first apparatus is provided with: a rotatable optical system for emitting a light beam onto the circular arc track of the optical record medium which is being moved straight in the straight line direction, while being rotated with an rotational axis perpendicular to the information record surface; a straight moving device for relatively moving the rotatable optical system and the optical record medium to each other in the straight line direction; a detecting device for detecting a displacement amount form the circular arc track at an irradiated position on the information record surface of the light beam, on the basis of a reflection light from the circular arc track of the light beam, and outputting a displacement amount signal indicating the detected displacement amount; a perpendicularly moving device for relatively moving the optical record medium and the rotatable optical system to each other perpendicularly to the straight line direction such that the irradiated position approaches the circular arc track, on the basis of the outputted displacement amount signal; and a recording and reproducing device for recording and reproducing the information onto and from the optical record medium by use of the light beam emitted to the circular arc track.

According to the first apparatus of the present invention, while the rotatable optical system is being rotated, the light beam for recording and reproducing the information is emitted from the rotatable optical system onto the circular arc track of the optical record medium, which is being moved straight with respect to the rotatable optical system in the straight line direction by the straight moving device. Then, the displacement amount form the circular arc track at the irradiated position on the information record surface of the light beam is detected on the basis of a reflection light from the circular arc track of the light beam, and the displacement amount signal is outputted by the detecting device. Then, the optical record medium and the rotatable optical system is moved to each other perpendicularly to the straight line direction by the perpendicularly moving device, such that the irradiated position approaches the circular arc track, on the basis of the outputted displacement amount signal. Finally, by use of the light beam emitted to the circular arc track, the information is recorded onto and reproduced from the optical record medium by the recording and reproducing device.

Accordingly, even if the central line of the circular arc tracks is displaced or offset from the rotation center of the rotatable optical system, the displacement can be compensated by the perpendicularly moving device. Thus, the light beam can be always emitted onto the circular arc track precisely during the recording and reproducing operation i.e., the tracking operation can be precisely executed, so that the information can be exactly recorded onto and reproduced from the circular arc track by the first apparatus of the present invention.

In one aspect of the first apparatus of the present invention, the perpendicularly moving device fixes a position of the rotational axis of the rotatable optical system, and further moves the optical record medium perpendicularly to the straight line direction on the basis of the outputted displacement amount signal.

According to this aspect, the position of the rotational axis of the rotatable optical system is fixed by the perpendicularly moving device. Then, the optical record medium is moved perpendicularly to the straight line direction, on the basis of the outputted displacement amount signal, by the perpendicularly moving device. Accordingly, it is not necessary to move the rotatable optical system, which is being rotated, by the perpendicularly moving device, so that the constitution of the first apparatus of the present invention can be simplified, and that the generation of the error in the detection of the irradiation position of the light beam due to the movement of the rotatable optical system can be prevented.

In this aspect, the perpendicularly moving device may comprise a piezoelectric element for moving the optical record medium perpendicularly to the straight line direction on the basis of the outputted displacement amount signal. Thus, as the outputted displacement amount signal is supplied to the piezoelectric element, the optical record medium is moved perpendicularly to the straight line direction by the piezoelectric element in this case. Accordingly, the constitution of the perpendicularly moving device can be simplified.

Alternatively in this aspect, the perpendicularly moving device may comprise: a yoke including a perpendicular portion extending perpendicularly to the straight line direction; and a coil, which is fixed on the perpendicular portion of the yoke and to which the outputted displacement amount signal is supplied, for moving the optical record medium along the perpendicular portion of the yoke on the basis of the outputted displacement amount signal. Thus, as the outputted displacement amount signal is supplied to the coil, the optical record medium is moved perpendicularly to the straight line direction by the coil and the yoke, in this case. Accordingly, the constitution of the perpendicularly moving device can be simplified.

Alternatively in this aspect, the perpendicularly moving device may comprise: a first gear fixed on a main body of the optical record medium; a second gear engaged with the first gear; and a motor, to which the outputted displacement amount signal is supplied, for driving the second gear so as to move the optical record medium perpendicularly to the straight line direction through the first gear on the basis of the outputted displacement amount signal. Thus, as the outputted displacement amount signal is supplied to the motor, the optical record medium is moved perpendicularly to the straight line direction by the motor through the first and second gears, in this case. Accordingly, the constitution of the perpendicularly moving device can be simplified.

Alternatively in this aspect, the perpendicularly moving device may comprise: an arm fixed on a main body of the optical record medium; a rotor to which the arm is rotatably connected and which has a coil to which the outputted displacement amount signal is supplied; a magnetic circuit, in which the coil of the rotor is mounted, for rotating the rotor so as to move the optical record medium through the arm on the basis of the outputted displacement amount signal. Thus, as the outputted displacement amount signal is supplied to the coil, the optical record medium is moved perpendicularly to the straight line direction by the rotor and the magnetic circuit through the arm, in this case. Accordingly, the constitution of the perpendicularly moving device can be simplified.

Alternatively, in this aspect, the perpendicularly moving device may comprise: a yoke including a perpendicular portion extending perpendicularly to the straight line direction; and a coil, which is movably wrapped around the perpendicular portion of the yoke and is fixed on a main body of the optical record medium and to which the outputted displacement amount signal is supplied, for moving the optical record medium along the perpendicular portion of the yoke on the basis of the outputted displacement amount signal. Thus, as the outputted displacement amount signal is supplied to the soil, the optical record medium is moved perpendicularly to the straight line direction by the yoke and the coil, in this case. Accordingly, the constitution of the perpendicularly moving device can be simplified.

The above object of the present invention can be also achieved by a second apparatus for optically recording and reproducing information onto and from an optical record medium having an information record surface on which a plurality of straight line tracks, on each of which the information is recorded and from each of which the information is reproduce, are arranged in parallel to each other such that all of the straight line tracks are directed in a straight line direction. The second apparatus is provided with: an optical system for emitting a light beam onto the straight line track of the optical record medium which is being moved straight in the straight line direction; a first moving device for relatively moving the optical system and the optical record medium to each other in the straight line direction for each of the straight line tracks; a detecting device for detecting a displacement amount form the straight line track at an irradiated position on the information record surface of the light beam, on the basis of a reflection light from the straight line track of the light beam, and outputting a displacement amount signal indicating the detected displacement amount; a second moving device for relatively moving the optical record medium and the optical system to each other such that the irradiated position approaches the straight line track, on the basis of the outputted displacement amount signal; and a recording and reproducing device for recording and reproducing the information onto and from the optical record medium by use of the light beam emitted to the straight line track.

According to the second apparatus, the light beam for recording and reproducing the information is emitted by the optical system onto the straight line track of the optical record medium, which is being moved straight in the straight line direction. Then, the optical system and the optical record medium are relatively moved to each other in the straight line direction for each of the straight line tracks, by the first moving device. Then, the displacement amount from the straight line track at the irradiated position on the information record surface of the light beam is detected on the basis of a reflection light from the straight line track of the light beam, and the displacement amount signal is outputted by the detecting device. Then, the optical record medium and the optical system are relatively moved to each other by the second moving device, such that the irradiated position approaches the straight line track, on the basis of the outputted displacement amount signal. Finally, the information is recorded onto and reproduced from the optical record medium by use of the light beam emitted to the straight line track, by the recording and reproducing device.

Accordingly, even if the straight line direction of the straight line tracks is displaced or offset from the moving direction of the optical system by the first moving device, the displacement can be compensated by the second moving device. Thus, the light beam can be always emitted onto the straight line track precisely during the recording and reproducing operation i.e., the tracking operation can be precisely executed, so that the information can be exactly recorded onto and reproduced from the straight line track by the second apparatus of the present invention.

In one aspect of the second apparatus of the present invention, the second moving device comprises a motor, to which the displacement amount signal is supplied, for rotating the optical record medium with respect to the optical system on the basis of the outputted displacement amount signal.

According to this aspect, as the displacement amount signal is supplied to the motor, the optical record medium is rotated with respect to the optical system by the motor, on the basis of the outputted displacement amount signal. Accordingly, the constitution of the second moving device can be simplified.

In another aspect of the second apparatus of the present invention, the second moving device comprises: an arm fixed on one side of the optical record medium; a coil, which is fixed on the arm and to which the displacement amount signal is supplied; and a magnetic circuit in which the coil is mounted, for rotating the optical record medium through the arm on the basis of the outputted displacement amount signal.

According to this aspect, as the displacement amount signal is supplied to the coil, the optical record medium is rotated by the coil and the magnetic circuit through the arm, on the basis of the outputted displacement amount signal. Accordingly, the constitution of the second moving device can be simplified.

In another aspect of the second apparatus of the present invention, the second moving device comprises: a shaft fixed on one side of the optical record medium; and a piezoelectric element, which is fixed on the other side of the optical record medium and to which the displacement amount signal is supplied, for rotating the optical record medium around the shaft on the basis of the outputted displacement amount signal.

According to this aspect, as the displacement amount signal is supplied to the piezoelectric element, the optical record medium is rotated around the shaft by the piezoelectric element, on the basis of the outputted displacement amount signal. Accordingly, the constitution of the second moving device can be simplified.

The nature, utility, and further features of this invention will be more clearly apparent form the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(1) First Embodiment

At first, a first embodiment according to the present invention is explained with reference to FIGS. 1 to 8B.

An optical card (or an optical tape) used in the first embodiment described below records and reproduces information by using an magneto-optical method.

The first embodiment described below is an embodiment in which the present invention is applied to an optical information recording and reproducing apparatus comprising a rotatable optical system.

At first, a whole configuration of the optical information recording and reproducing apparatus of the first embodiment is explained with reference to FIG. 1.

Figure 1:
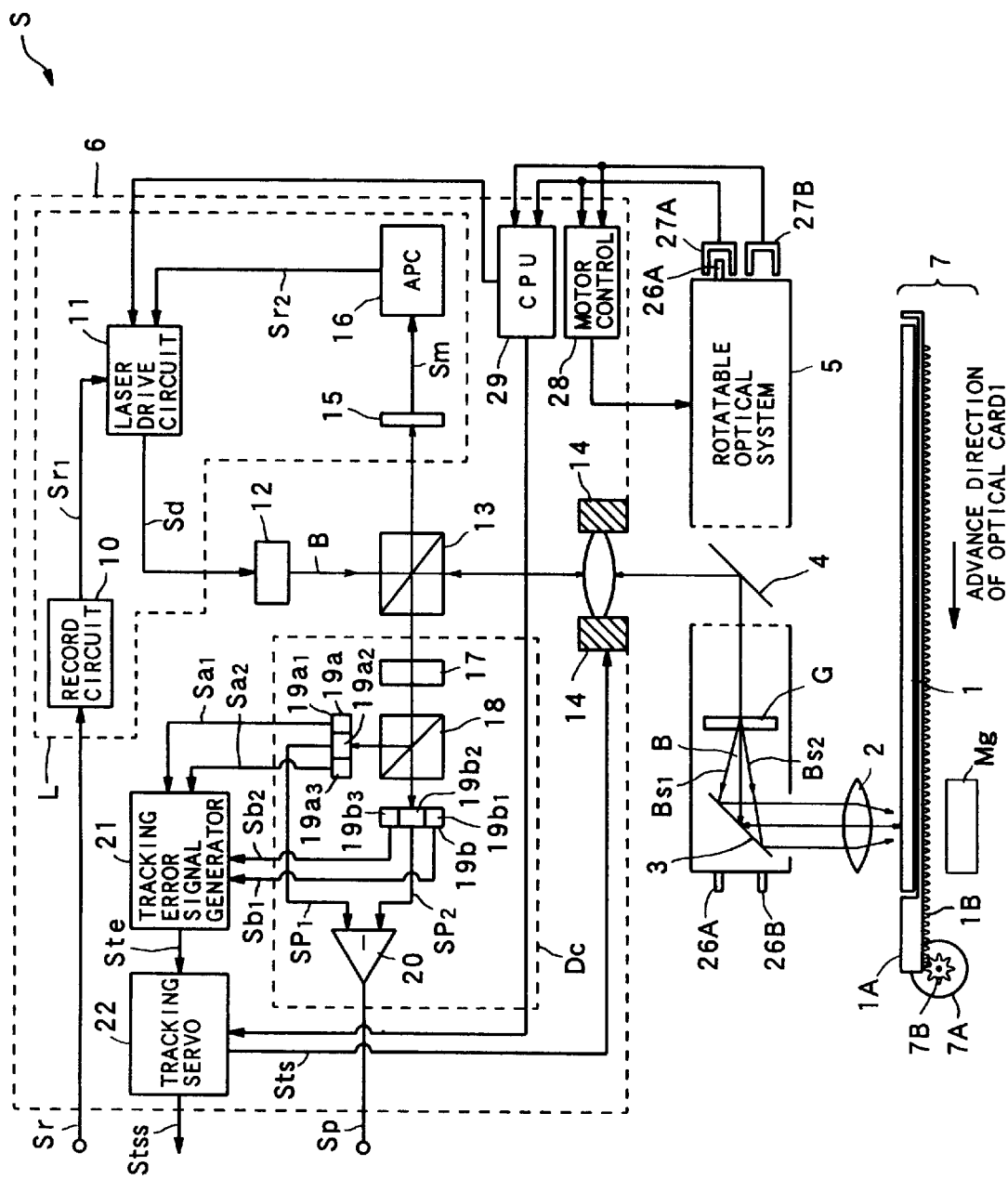
FIG. 1 is a block diagram showing a schematic configuration of an optical information recording and reproducing apparatus as a first embodiment.

As shown in FIG. 1, an optical information recording and reproducing apparatus S of the first embodiment is provided with: a stationary optical system 6 having (i) a laser diode 12 for emitting a light beam B (as a light beam for recording) to record information onto an optical card 1 when recording the information, on the basis a record signal Sr from a signal processor (not shown), and further emitting the light beam B (as a light beam for reproducing) to reproduce the information when reproducing the information, and (ii) light receiving devices 19a and 19b for receiving a reflection light from the optical card 1 of the light beam B (the light beam for reproducing) when reproducing the information to thereby output a reproduction signal Sp; a rotatable optical system 5 for collecting on the optical card 1 the light beam B (the light beam for recording) emitted from the stationary optical system 6 when recording, and further guiding to the stationary optical system 6 the reflection light of the light beam B (the light beam for reproducing) from the optical card 1 when reproducing, while it is being rotated with a straight line perpendicular to a record surface of the optical card 1 as a central axis; a card transferring section 7 for moving the optical card 1 in a direction parallel to a straight line on which central points of the respective circular arc information tracks TR on the optical card 1 exist (i.e., left and right directions in FIG. 1) when recording and reproducing the information; and a magnet MG for applying a magnetic field to the optical card 1 when recording and reproducing the information. Incidentally, the record signal Sr is inputted from and the reproduction signal Sp is outputted to the signal processor. The signal processor processes an external input signal to be recorded and then converts it into the record signal Sr to thereby output it to the stationary optical system 105. The signal processor further processes a reproduction signal Sp from the stationary optical system 105 to externally output it as an output signal.

Among them, the stationary optical system 6 is provided with: a laser controller L for outputting a laser drive signal Sd to control the light beam B emitted from the laser diode 12, on the basis of the record signal Sr; the laser diode 12 for emitting the light beam B on the basis of the laser drive signal Sd; a beam splitter 13 for reflecting some of the light beams B from the laser diode 12 to thereby guide it to a monitor detector 15 contained in the laser controller L, and also transmitting another some of the light beams B to thereby guide it to an actuator 14 described later, and further reflecting the light beam B reflected by the optical card 1 to thereby guide it to a light receiving section Dc described later; the actuator 14 which comprises a relay lens and a driver therefor for performing a tracking control and a focus control for the light beam B; the light receiving section Dc for receiving the light beam B reflected by the beam splitter 13 to thereby generate and output the reproduction signal Sp based thereon, and further receiving the reflection light from the optical card 1 based on sub-beams Bs1 and Bs2 to thereby output tracking error detection signals Sa1, Sa2, Sb1 and Sb2; a tracking error signal generator 21 for outputting a tracking error signal Ste for the tracking control of the light beam B, based on the tracking error detection signals Sa1, Sa2, Sb1 and Sb2; a tracking servo section 22 for generating a tracking servo signal Sts and a piezoelectric element drive signal Stss based on the tracking error signal Ste to thereby output them respectively to the actuator 14 and a piezoelectric element described later; a CPU 29 for controlling the tracking servo section 22 and the laser controller L on the basis of signals outputted by detecting sections 27A and 27B described later, and further controlling the optical information recording and reproducing apparatus S as a whole when recording and reproducing the information; and a motor controller 28 for controlling a motor (not shown) for actually rotating the rotatable optical system 5 on the basis of the signals outputted by the detecting sections 27A and 27B described later.

On the other hand, the rotatable optical system 5 is provided with: reflection mirrors 3 and 4 for forming an optical path of guiding to an objective lens 2 the light beam B (the light beam for recording) emitted by the stationary optical system 6 when recording, and further guiding to the stationary optical system 6 the reflection light from the optical card 1 of the light beam B (the light beam for reproducing) when reproducing; a grating G for dividing the light beam B into a main beam Bm to record and reproduce the information and two sub-beams Bs1, Bs2 to obtain the tracking error signal; the objective lens 2 for collecting on the record surface of the optical card 1 the light beam B; detectably elements 26A arranged at each constant angle around a body which constitutes the rotatable optical system 5 and also includes the objective lens 2, the reflection mirrors 3 and 4, and the grating G; a detectable element 26B disposed on the body outside a position at which the objective lens 2 is disposed; the detector 27A composed of a photo-coupler and the like for outputting a signal indicative of the rotational number of the rotatable optical system 5 when the detectable elements 26A are passed therethrough; and the detector 28B composed of a photo-coupler and the like to output a signal indicative of the position of the objective lens in the rotation of the rotatable optical system 5 when the detectable element 26B is passed therethrough, namely, an irradiated position of the light beam B on the optical card 1. A rotational number of the rotatable optical system 5 having the above mentioned configuration is controlled through the motor controller 28 by the CPU 29 on the basis of the signal from the detector 27A, for example, such that the rotational number is 3600 rpm, in order to improve a transfer rate of the recording and reproducing operation to the optical card 1.

Moreover, the card transferring section 7 is provided with: a tray 1A on which the optical card 1 is placed; a rack 1B formed in a direction to which the optical card 1 below the tray 1A is moved, a gear 7B formed so as to be engaged with the rack 1B, and a transferring motor 7A for rotating the gear 7B by the control of the CPU 29 to thereby move the optical card 1 to the left direction of FIG. 1. Although the card transferring section 7 has a mechanism of moving the optical card 1 to a direction perpendicular to a paper surface of FIG. 1 as well as the advance direction of the optical card 1, this is described later (refer to FIG. 4B).

The laser controller L is provided with: a record circuit 10 for applying a signal process, such as a modulation and the like, to the record signal Sr to thereby output a record control signal Sr1; the monitor detector 15 for receiving the light beam B reflected by the beam splitter 13 to thereby output a monitor signal Sm; an APC (Auto Power Controller) circuit 16 for outputting a monitor control signal Sr2 to control a power of the light beam B, based on the monitor signal Sm; and a laser drive circuit 11 for outputting the laser drive signal Sd to drive the laser diode 12 by the control of the CPU 29, based on the record control signal Sr1 and the monitor control signal Sr2.

On the other hand, the light receiving section Dc is provided with: a cylindrical lens 17 for giving an astigmatism to the reflection light of the light beam B from the optical card 1 reflected by the beam splitter 13 in order to obtain a focus error signal used for the focus control of the light beam B; a PBS (Polarization Beam Splitter) 18 for transmitting only a polarization having a predetermined polarization state included in the reflection light of the light beam B to which the astigmatism has been given and reflecting the other polarization; the light receiving device 19a which comprises a light receiving device 19a2 for receiving the polarization reflected by the PBS 18 to thereby output an information detection signal Sp1 and further comprises light receiving devices 19a1 and 19a3 for receiving the reflection light from the optical card 1 based on the sub-beams Bs1 and Bs2 respectively included in the polarization reflected by the PBS 18 to thereby output the tracking error detection signals Sa1 and Sa2 respectively; the light receiving device 19b which comprises a light receiving device 19b2 for receiving the polarization transmitted by the PBS 18 to thereby output an information detection signal Sp2 and further comprises light receiving devices 19b1 and 19b3 for receiving the reflection light from the optical card 1 based on the sub-beams Bs1 and Bs2 respectively included in the polarization transmitted by the PBS 18 to thereby output the tracking error detection signals Sb1 and Sb2 respectively; and a differential amplifier 20 for outputting as the reproduction signal Sp a differential signal of the information detection signals Sp1 and Sp2.

In the above mentioned configuration, as the optical path is shown in FIG. 1, when recording the information, the light beam B (the light beam for recording) is emitted by the laser diode 12 based on the laser drive signal Sd corresponding to the record signal Sr, is divided into the main beam Bm and the two sub-beams Bs1 and Bs2 by the grating G, and are irradiated onto the record surface of the optical card 1. Then, the information is recorded by the main beam Bm. The reflection light from the optical card 1 of the sub-beams Bs1 and Bs2 is guided through the reflection mirrors 3 and 4 and the beam splitter 13 to the light receiving section Dc. The tracking servo signal Sts for the tracking control is generated on the basis of the reflection light.

Figure 11:
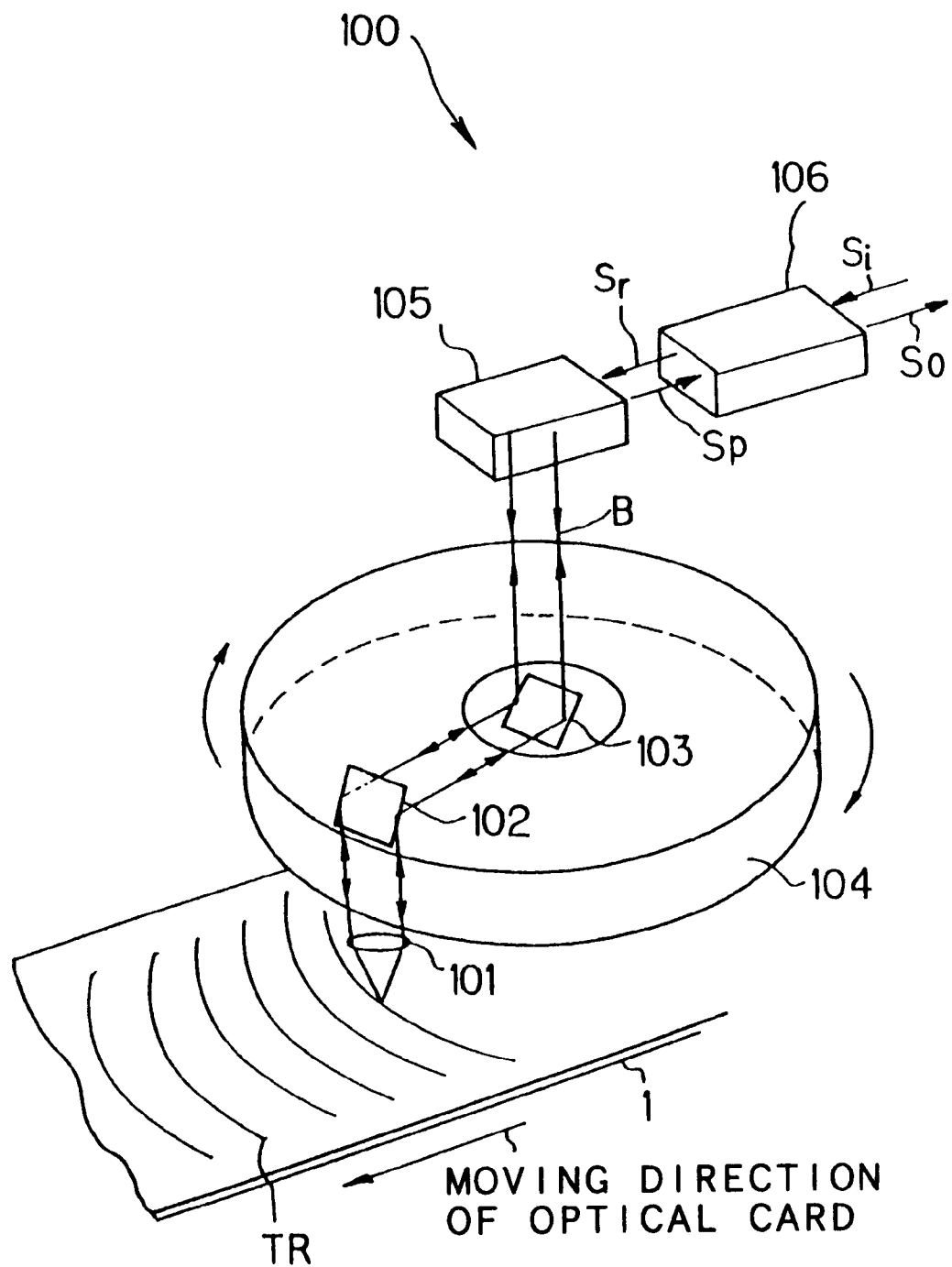
FIG. 11 is a perspective view showing a configuration of an optical information recording and reproducing apparatus having a rotatable optical system.
Figure 12:
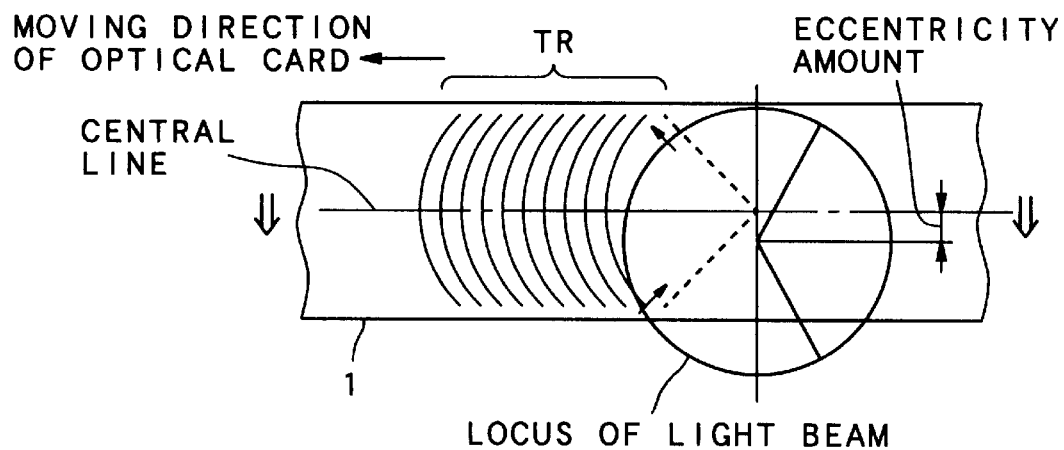
FIG. 12A is a plan view showing one condition of a tracking displacement due to an eccentricity, in which a locus of a rotational center of the rotatable optical system and a central line of information tracks are parallel to each other and are eccentric to each other.
FIG. 12B is a plan view showing another condition of a tracking displacement due to an eccentricity, in which the locus of the rotational centers of the rotatable optical system and the central line of the information tracks are not parallel to each other.
Figure 12:
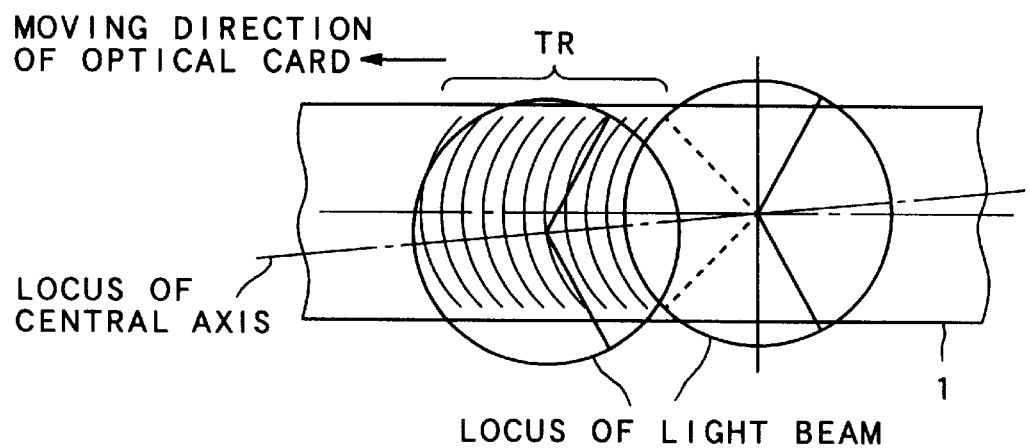

At this time, the rotatable optical system 5, which integrates the reflection mirrors 3 and 4, the grating G and the objective lens 2 into a single unit, is rotated by a motor (not shown) with a straight line perpendicular to the record surface of the optical card 1 as a rotational axis. Accordingly, as mentioned above, the circular arc information tracks TR (refer to the symbol TR in FIGS. 11 or 12) are formed on the record surface of the optical card 1.

When reproducing the information, the light beam B (the light beam for reproducing) is emitted by the laser diode 12 based on the laser drive signal Sd, and then divided into the main beam Bm and the two sub-beams Bs1 and Bs2 by the grating G, and are irradiated onto the record surface of the optical card 1. Then, the information is reproduced by the main beam Bm. Similarly to the recording operation, the tracking servo signal Sts for the tracking control is generated on the basis of the reflection light from the optical card 1 of the sub-beams Bs1 and Bs2.

When reproducing the information, the information recorded on the information track TR is reproduced while the rotatable optical system 5 is rotated similarly to the case of recording the information.

The known magneto-optical recording and reproducing method is used for the optical card 1 when recording and reproducing the information. Thus, the detailed explanations thereof are omitted.

Next, a relation between the information track TR and the respective irradiated positions of the main beam Bm and the sub-beams Bs1 and Bs2 when recording and reproducing the information of this embodiment is explained with reference to FIG. 2.

Figure 2:
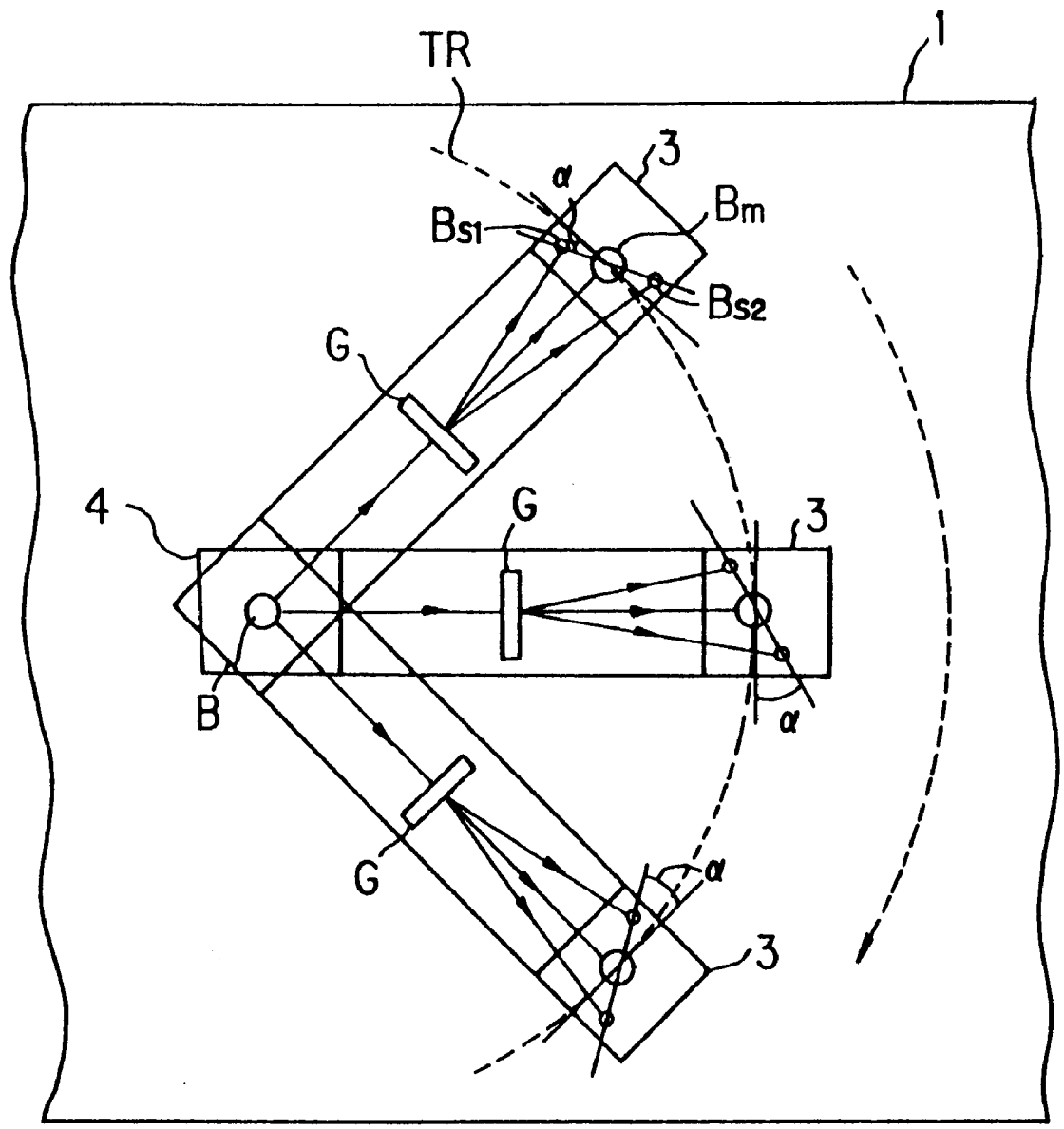
FIG. 2 is a diagram showing a relation between an information track and an irradiated position of a light beam in the first embodiment.

As shown in FIG. 2, in this embodiment, the grating G for dividing the light beam B is disposed between the reflection mirrors 3 and 4 of the rotatable optical system 5. Thus, the positional relation between the information track TR and the respective irradiated positions of the main beam Bm and the sub-beams Bs1 and Bs2 which are divided by the grating G is always constant independently from the rotation of the rotatable optical system 5.

More concretely, an angle $\alpha$ contained by a tangent of the circular arc information track TR and a straight line connecting the respective irradiated positions of the main beam Bm and the sub-beams Bs1 and Bs2 is constant independently from the rotation of the rotatable optical system 5. Thus, a distance between the information track TR and the irradiated positions of the sub-beams Bs1 and Bs2 is constant independently from the rotation.

Hence, the proper tracking error signal Ste can be obtained independently from the rotation of the rotatable optical system 5. Therefore, a conventional three-beam tracking control method can be used for the optical information recording and reproducing apparatus S for the optical card 1.

Next, a configuration of the tracking error signal generator 21 is explained with reference to FIGS. 3A and 3B.

Figure 3A:
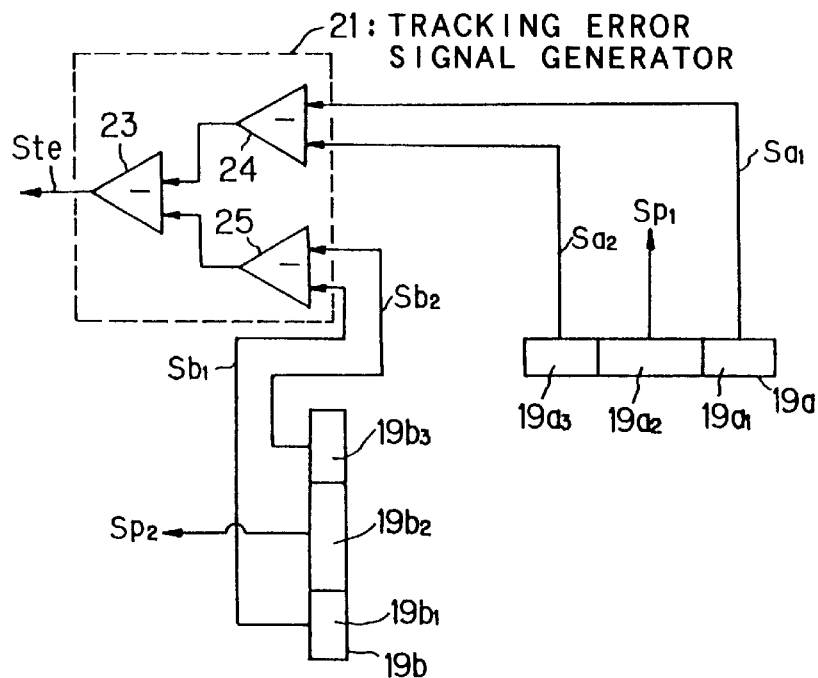
FIG. 3A is a block diagram showing a configuration of one example of a tracking error signal generator in the first embodiment.
Figure 3B:
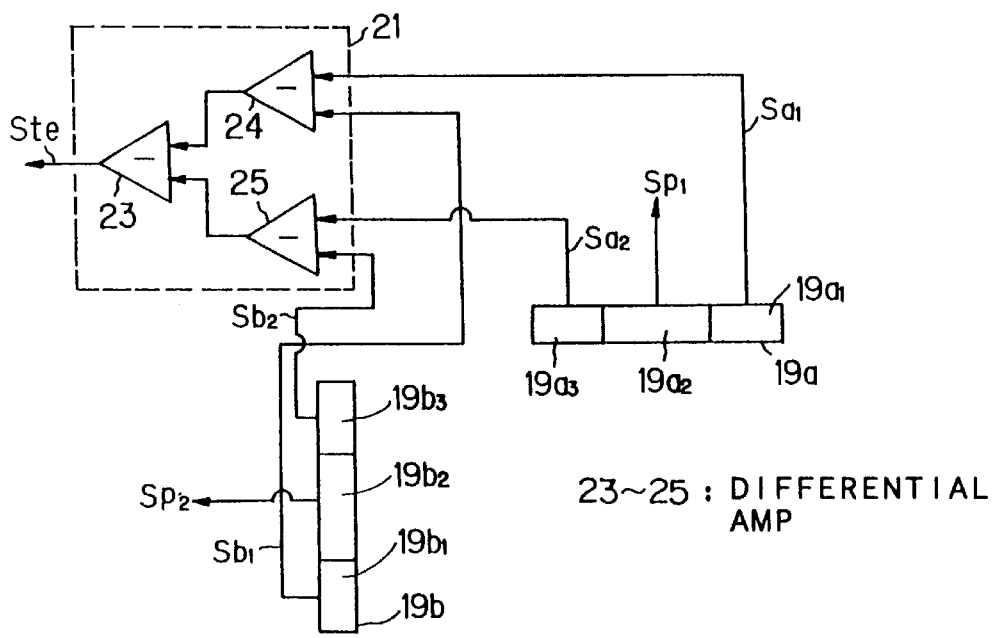
FIG. 3B is a block diagram showing a configuration of another example of the tracking error signal generator in the first embodiment.

As shown in FIGS. 3A and 3B, the tracking error signal generator 21 is composed of three differential amplifiers 23 to 25. Each of the differential amplifiers 23 to 25 outputs a differential signal between the respective input signals.

In the configuration shown in FIG. 3A, the differential amplifier 24 outputs a differential signal between the tracking error detection signals Sa1 and Sa2, and the differential amplifier 25 outputs a differential signal between the tracking error detection signals Sb1 and Sb2. Based on these differential signals, the differential amplifier 23 outputs a differential signal between the respective differential signals, i.e., outputs the tracking error signal Ste.

In the configuration shown in FIG. 3B, the differential amplifier 24 outputs a differential signal between the tracking error detection signals Sa1 and Sb1, and the differential amplifier 25 outputs a differential signal between the tracking error detection signals Sa2 and Sb2. Based on these differential signals, the differential amplifier 23 outputs a differential signal between the respective differential signals, i.e., outputs the tracking error signal Ste.

In FIG. 1 again, the tracking error signal Ste is outputted in accordance with the above mentioned operations of the tracking error signal generator 21. Based on it, the tracking servo signal Sts is generated by the tracking servo section 22 and is outputted to the actuator 14. Further, the piezoelectric element drive signal Stss is generated by the tracking servo section 22 and is outputted to the piezoelectric element described later. Then, in the actuator 14, the tracking servo control is applied to the light beam B based on the tracking servo signal Sts. Further, the piezoelectric element is driven in order to compensate a large tracking displacement that cannot be compensated in the tracking servo control.

Next, a detailed configuration of the tracking servo section 22 is explained with reference to FIG. 4A.

Figure 4A:
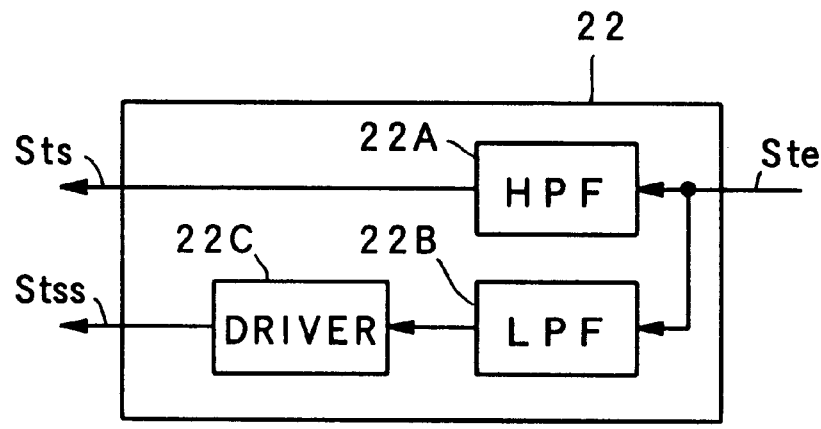
FIG. 4A is a block diagram showing a configuration of a tracking servo section in the first embodiment.

As shown in FIG. 4A, the tracking servo section 22 is provided with: an HPF (High Pass Filter) 22A for extracting a tracking error signal component, which has a high frequency to be compensated by the actuator 14, from the tracking error signal Ste to thereby output it as the tracking servo signal Sts; an LPF (Low Pass Filter) 22B for extracting a tracking error signal component, which has a low frequency to be compensated through a movement perpendicular to the moving direction of the optical card 1 by the piezoelectric element, from the tracking error signal Ste (i.e. the signal component corresponding to the large tracking displacement which cannot be compensated by the actuator 14); and a driver 22C for amplifying the piezoelectric element drive signal Stss to a level at which the piezoelectric element can be driven. Incidentally, in the above mentioned configuration, a cutoff frequency of the LPF 22B is approximately 10 kHz under the condition that the rotational number of the rotatable optical system 5 is set to 3600 rpm, the track pitch between the information tracks TR is set to 1.6 to 2 μm and that the maximum value of the displacement (eccentricity amount) between the rotational center of the rotatable optical system 5 and the straight line connecting the centers of the respective information tracks TR is set to 100 μm. At this time, a frequency of the signal outputted as the piezoelectric element drive signal Stss is in a range between approximately 3 kHz and 10 kHz.

Next, a detailed configuration of the card transferring section 7 according to the present invention is explained with reference to FIG. 4B. Incidentally, FIG. 4B is a plan view when the card transferring section 7 including the optical card 1 is seen from a direction perpendicular to the recording and reproducing surface of the optical card 1.

Figure 4B:
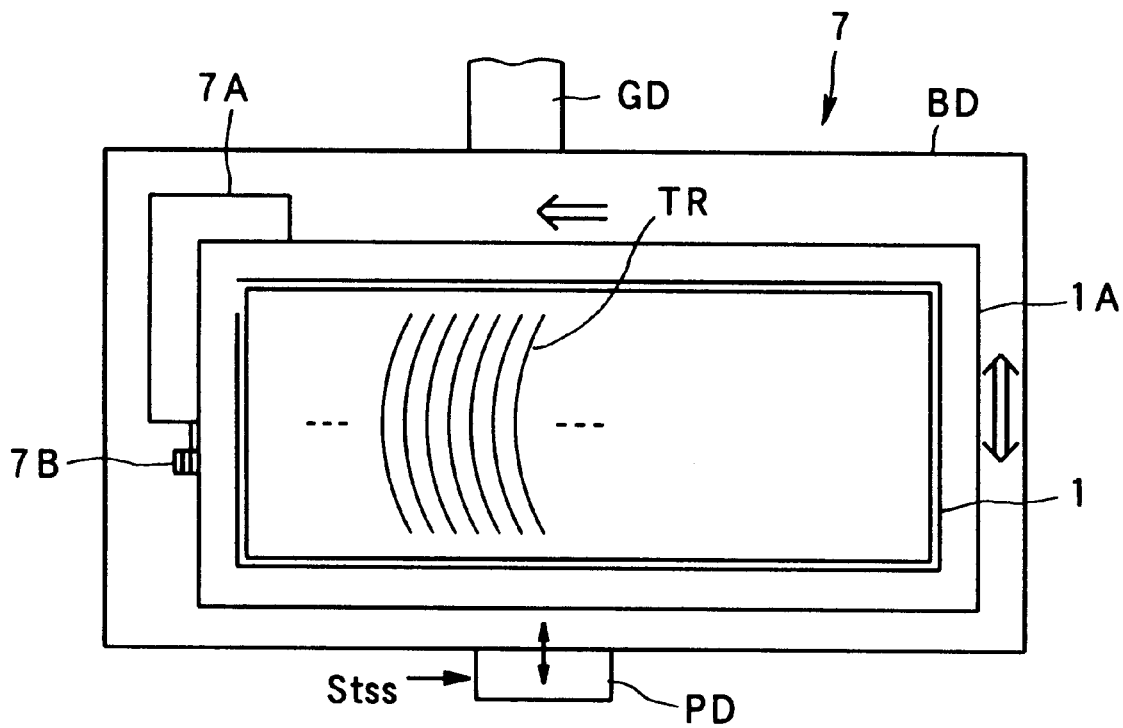
FIG. 4B is a plan view of a card transfer section in the first embodiment.

As shown in FIG. 4B, the card transferring section 7 is provided with: the gear 7B engaged with the tray 1A and the rack 1B (refer to FIG. 1); the transferring motor 7A; the piezoelectric element PD for moving a body BD containing the tray 1A, the rack 1B, the gear 7B and the transferring motor 7A to a direction (upward and downward directions in FIG. 4B (shown by both upward and downward arrows of FIG. 4B)) perpendicular to the transfer direction (a left direction of FIG. 4B) of the optical card 1, based on the piezoelectric element drive signal Stss; and a supporter GD made of a deformable rubber and the like for supporting a movement of the body BD by the piezoelectric element PD. Under this configuration, an application of the piezoelectric element drive signal Stss to the piezoelectric element PD causes deviations in the upward and downward directions of FIG. 4B on the basis of an amplification and a frequency of the piezoelectric element drive signal Stss. Accordingly, the body BD fixed to the piezoelectric element PD is also moved to the upward and downward directions of FIG. 4B.

Figure 5A:
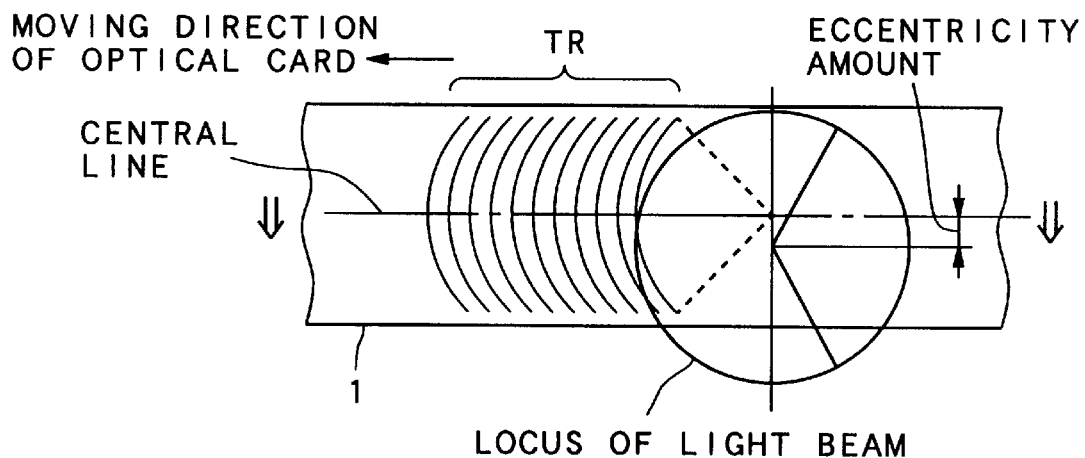
FIG. 5A is a plan view showing a state before a tracking servo control is applied in the first embodiment.
Figure 5B:
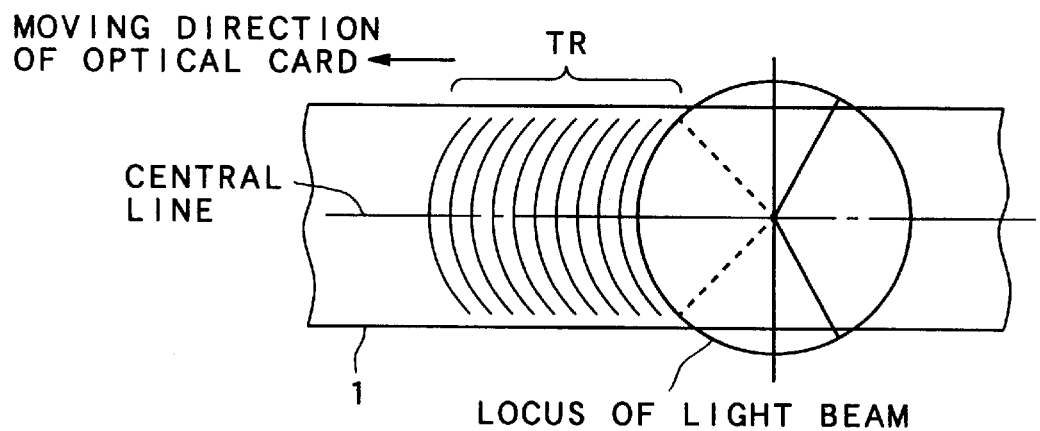
FIG. 5B is a plan view showing a state after the tracking servo control is applied in the first embodiment.

Next, a relation between the tracking servo control and the movement in the upward and downward directions of FIG. 4B of the optical card 1 in accordance with the operation of the piezoelectric element PD is explained with reference to FIGS. 5A and 5B. FIGS. 5A and 5B are plan views when seen from a direction perpendicular to the information record surface of the optical card 1. FIG. 5A shows the state that the tracking is not properly applied (refer to FIG. 12A) but is certainly displaced when the piezoelectric element PD is not actuated. FIG. 5B shows the state that the tracking displacement is canceled by the movement of the optical card 1 to the direction perpendicular to the central line of the information track TR in accordance with the operation of the piezoelectric element PD.

As can be seen from FIGS. 5A and 5B, even when the position of the rotational center of the rotatable optical system 5 is displaced or shifted from the central line of the circular arc information tracks TR (FIG. 5A), if the whole optical card 1 is moved to the direction perpendicular to the central line of the information tracks TR (upward directions of FIGS. 5A and 5B) by the piezoelectric element PD driven in accordance with the piezoelectric element drive signal Stss generated on the basis of the tracking error signal Ste including the displacement or shift component, the displacement is canceled. This results in the coincidence between the position of the information track TR and the irradiated position of the light beam B to thereby enable the exact tracking. Accordingly, even if a large tracking displacement, which cannot be compensated by the actuator 14, is brought about, it can be compensated to exactly trace the information track TR. Incidentally, in this operation, it is enough that the tracking control operation is performed only once each time one information track TR is formed (i.e., each time the irradiated position of the light beam B is moved from one information track TR onto another information track TR when reproducing the information). It is not necessary to drive the piezoelectric element PD in the middle course that one information track TR is formed (or, in the middle course that the irradiated position of the light beam B is moved onto one information track TR).

As shown in FIG. 12B, even if the central line of the circular arc information tracks TR is not parallel to the locus of the rotational center in the rotatable optical system 5, the above mentioned operation of the piezoelectric element PD executed each time one information track TR is formed causes the central line of the information tracks TR and the locus of the irradiated positions of the light beams B to be always coincident with each other to thereby enable the exactly tracking control.

The above mentioned explanation is mainly described with the information reproduction as a target. However, even when recording the information, it is possible to similarly apply the exactly tracking control to the information track (when recording, for example, a circular arc tracks which are formed in advance on the optical card 1 or the like is corresponding to the information track TR).

As mentioned above, according to the optical information recording and reproducing apparatus S of the embodiment, the optical card 1 is moved by the piezoelectric element PD perpendicularly to the direction in which the optical card 1 is moved. The irradiated position of the light beam B is set on the information track TR. Then, the information is recorded and reproduced. Thus, the information can be exactly recorded onto and reproduced from the information track TR.

The position of the central axis of the rotation in the rotatable optical system 5 is made stationary. Further, the optical card 1 is moved perpendicularly to the transfer direction thereof by the piezoelectric element PD, on the basis of the piezoelectric element drive signal Stss. Thus, it is not necessary to move the rotatable optical system 5 which is being rotated. This results in the simplified configuration of the optical information recording and reproducing apparatus S. Also, it is possible to protect the occurrence of the erroneous irradiated position of the light beam B associated with the movement of the rotatable optical system 5.

Moreover, the piezoelectric element PD for moving the optical card 1 on the basis of the piezoelectric element drive signal Stss is used as a device for moving the optical card 1 perpendicularly to the transfer direction thereof. Thus, it is possible to further simplify the configuration of the optical information recording and reproducing apparatus S.

The above mentioned embodiment is explained in relation to the case of recording and reproducing the information onto and from the optical card 1. However, the present invention is not limited thereto. The present invention can be applied to a case of moving a body including an optical tape and a mechanism for transferring the optical tape perpendicularly to the transfer direction to thereby perform the tracking control.

Next, various modified embodiments with regard to a configuration in which the optical card 1 in the optical information recording and reproducing apparatus S is moved perpendicularly to the transfer direction thereof are explained with reference to FIGS. 6A to 8B. Incidentally, descriptions of mechanisms of the tray 1A, the motor 23 and the like to transfer the optical card 1 to the transfer direction thereof are omitted in FIGS. 6A to 8B.

Figure 6A:
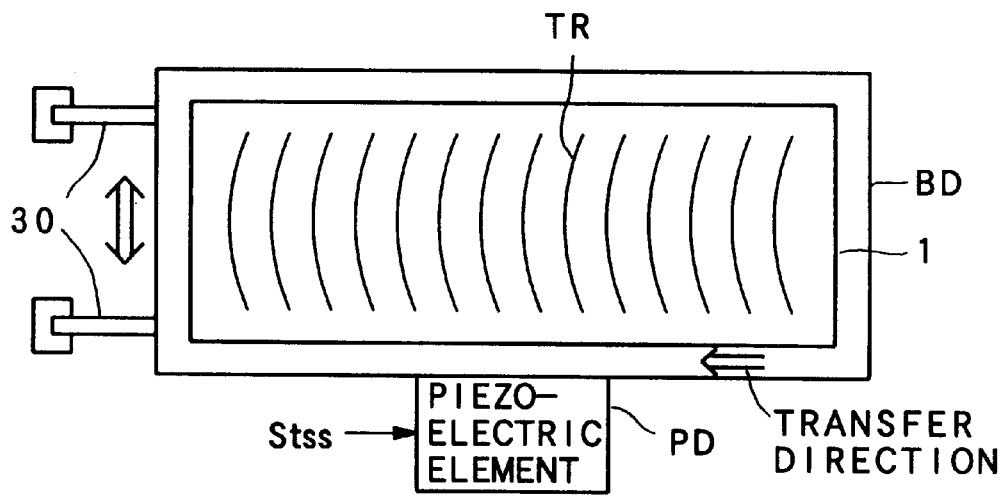
FIG. 6A is a plan view showing one modified example of the tracking servo mechanism using a plate spring.
Figure 6B:
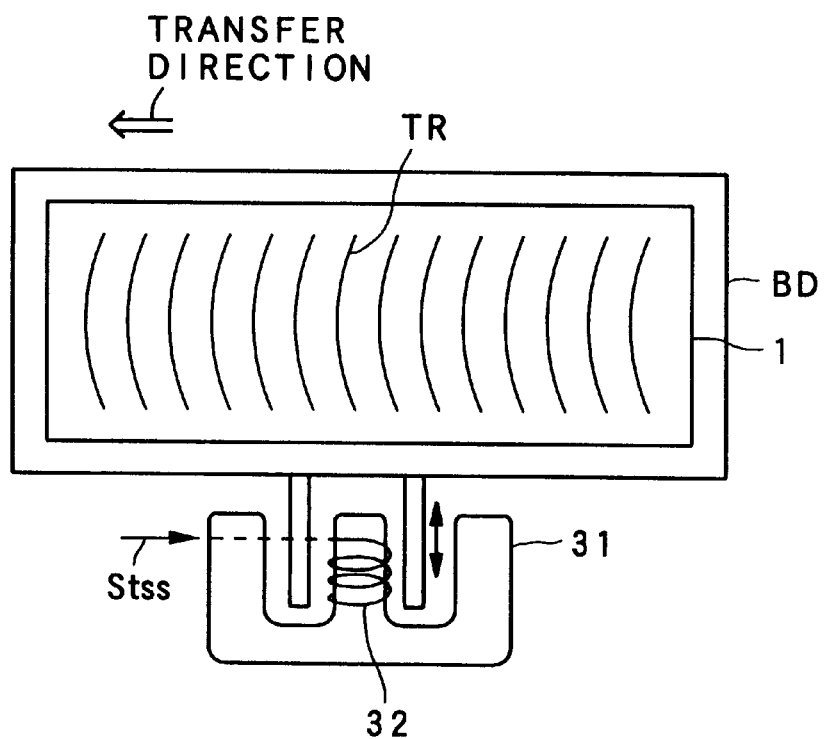
FIG. 6B is a plan view showing another modified example of a tracking servo mechanism using a coil and a yoke.

At first, as shown in FIG 6A, instead of using the supporter GD, a plate spring 30 may be employed which has a high rigidity in a direction perpendicular to a paper surface of FIGS. 6A and 6B, and which rigidity in upward and downward directions of FIGS. 6A and 6B is relatively weak, to thereby support the body BD including the tray 1A.

As shown in FIG. 6B, instead of using the piezoelectric element PD, a drive mechanism may be employed, which is constituted by a yoke (a magnetic core composed of a permanent magnet or a magnetic substance) 31 and a coil 32 fixed on the body BD, in which a signal corresponding to the piezoelectric element drive signal Stss is applied to the coil 32 to thereby move the optical card 1 perpendicularly to the transfer direction thereof.

Figure 7A:
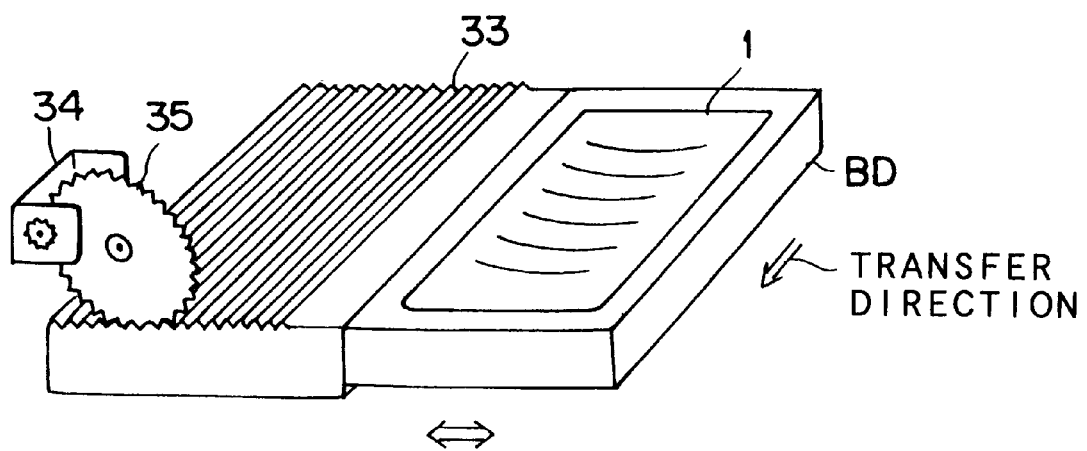
FIG. 7A is a perspective view showing another modified example of a tracking servo mechanism using a combination of a motor and a gear.

As shown in FIG. 7A, a gear plane 33 integrated with the body BD on the extension in the moving direction of the body BD (the direction perpendicular to the transfer direction of the optical card 1) may be employed, such that a drive mechanism is constituted by a gear 35 engaged with the gear plane 33 and a motor 34 for driving the gear 35, in which the motor 34 is driven by using a signal corresponding to the piezoelectric element drive signal Stss to thereby move the optical card 1 perpendicularly to the transfer direction thereof.

Figure 7B:
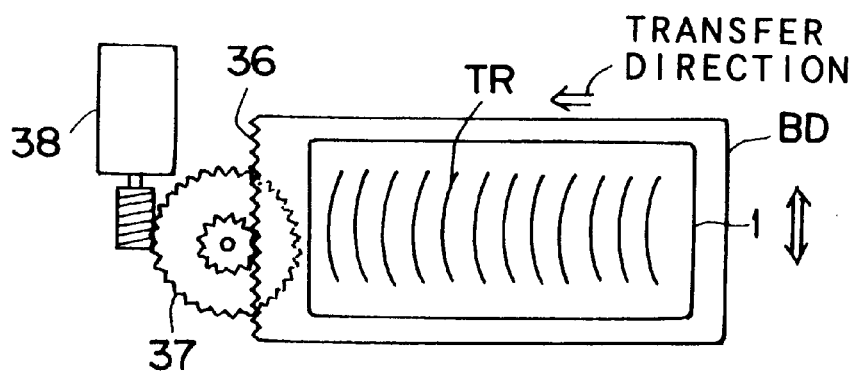
FIG. 7B is a plan view showing another modified example of a tracking servo mechanism of a linear type.

As shown in FIG. 7B, a rack 36 on a shorter side of the body BD (a side perpendicular to the transfer direction of the optical card 1) may be employed, such that a drive mechanism is constituted by a gear 37 engaged with the rack 36 and a motor for rotating the gear 37, in which the motor 38 is driven by using a signal corresponding to the piezoelectric element drive signal Stss to thereby move the optical card 1 perpendicularly to the transfer direction thereof.

Figure 8A:
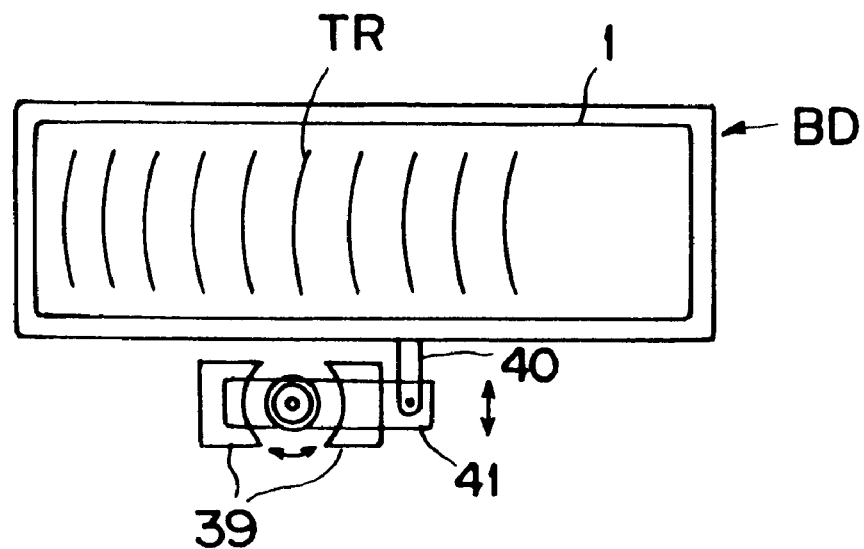
FIG. 8A is a plan view showing another modified example of a tracking servo mechanism of a shaft sliding type.

As shown in FIG. 8A, an arm 40 may be fixed on the body BD, which is rotatably connected to a rotor 41 having a coil mounted in a magnetic circuit 39, in which the piezoelectric element drive signal Stss is inputted to the coil of the rotor 41 so as to rotate it, and this rotational movement is converted into a linear movement of the body BD to thereby move the optical card 1 perpendicularly to the transfer direction thereof.

Figure 8B:
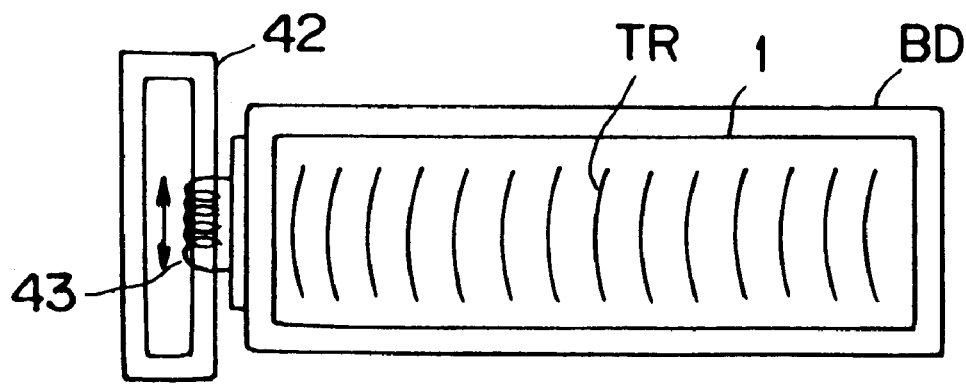
FIG. 8B is a plan view showing a tracking servo mechanism of a linear type.

As shown in FIG. 8B, a so-called linear method may be employed in which a coil 43 is movably wrapped around a yoke 42 composed of a permanent magnet and the like, and then the coil 43 is fixed on the body BD, and further the piezoelectric element drive signal Stss is inputted to the coil 43, and accordingly the body BD together with the coil 43 is moved to upward and downward directions of FIGS. 8A and 8B to thereby move the optical card 1 perpendicularly to the transfer direction thereof.

The modified embodiments as mentioned above can attain the effects similar to those of the aforementioned first embodiment.

(2) Second Embodiment

Next, a second embodiment of the present invention is explained with reference to FIGS. 9A to 10B. The first embodiment is the optical information recording and reproducing apparatus S having the rotatable optical system 5. In contrast to this, the second embodiment described below is an embodiment in relation to the aforementioned reciprocating type of the optical information recording and reproducing apparatus using the optical card. Incidentally, in FIGS. 9A, 9B, and 9C, the same constitutional elements as those in the first embodiment shown in FIG. 1 carry the same reference numbers, and the detailed explanations thereof are omitted.

At first, a whole configuration of the reciprocating type of the optical information recording and reproducing apparatus as the second embodiment is explained with reference to FIG. 9A. The reciprocating type of an optical information recording and reproducing apparatus S' is provided with: an optical car 1' in which a plurality of linear information tracks TR' are formed in parallel to each other and information is recorded and reproduced on the linear information tracks TR'; a tray 47 for carrying and transferring the optical card 1' to a direction parallel to the information track TR' (an optical card transfer direction shown by a symbol D in FIG. 9A); a belt 52 which is fixed on the tray 47 and transfers the tray 47 to the optical card transfer direction D through a rotation of a motor 46; a guiding section 53 for guiding the movement of the tray 47 to the optical card transfer direction D by the placement of the tray 47; an optical pickup 48 for emitting the light beam B to the optical card 1' to actually record and reproduce the information; a pickup transfer motor 45 for moving the pickup 48 to a direction perpendicular to the information track TR' (a pickup moving direction shown by a symbol D' in FIG. 9A) each time one information track TR' is formed; a motor supporter 49 for supporting the pickup transfer motor 45; a tray 55 for supporting the tray 47 carrying the optical card 1', and the motor 46 separated from the motor supporter 49; and a motor 50 for rotating the tray 55 including the optical card 1' within a plane including the information record surface in the optical card 1'.

Next, a more concrete configuration of the optical information recording and reproducing apparatus S' is explained with reference to FIG. 9B. Incidentally, FIG. 9B is a schematic configuration diagram in which the optical information recording and reproducing apparatus S' is seen from a side surface.

Figure 9A:
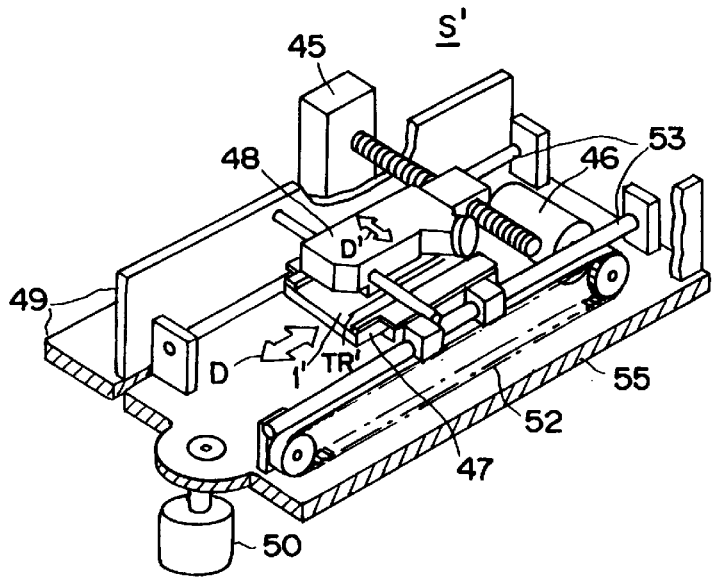
FIG. 9A is an externally perspective view showing a configuration of a reciprocating type of an optical information recording and reproducing apparatus according to a second embodiment.
Figure 9B:
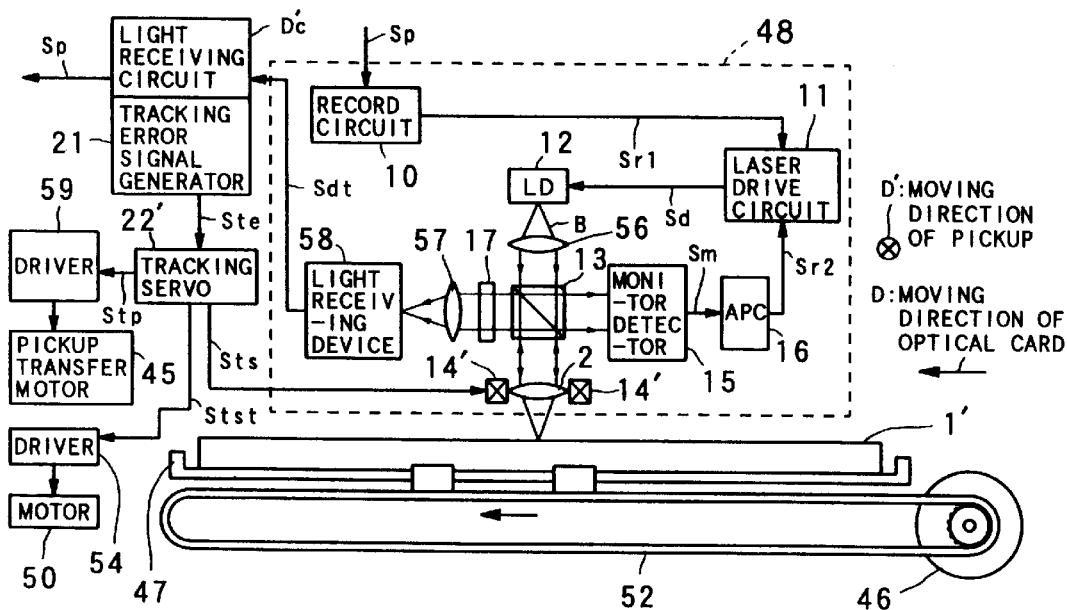
FIG 9B is a block diagram showing a schematic configuration of the reciprocating type of the optical information recording and reproducing apparatus of FIG. 9A.

As shown in FIG. 9B, the optical information recording and reproducing apparatus S' is provided with: the optical pickup 48; the tray 47 for carrying the optical card 1'; the belt 52; the motor 46; a light receiving circuit Dc' for outputting the reproduction signal Sp based on a detection signal Sdt which is outputted by the pickup 48 and described later; a tracking error signal generator 21 for outputting the tracking error signal Ste based on the signal generated by the light receiving circuit Dc'; a tracking servo section 22' for outputting a drive signal Stst to drive the motor 50, the tracking servo signal Sts to drive an actuator 14', which is contained in the pickup 48 and described later, to thereby perform the tracking control, and a drive signal Stp to drive the pickup transfer motor 45, on the basis of the tracking error signal Ste; a driver 54 for amplifying the drive signal Stst and then outputting it to the motor 50 to thereby drive the motor 50; and a driver 59 for amplifying the drive signal Stp and then outputting it to the pickup transfer motor 45 to thereby drive the pickup transfer motor 45.

The optical pickup 48 is provided with: the objective lens 2; a record circuit 10; a laser drive circuit 11; a laser diode (LD) 12; a beam splitter 13; the actuator 14' for driving the objective lens 2 on the basis of the tracking servo signal Sts to thereby perform the tracking control, and further driving the objective lens 2 to thereby perform the focus control; a monitor detector 15; an APC (Automatic Power Control) circuit 16; a cylindrical lens 17; a collimator lens 56 for causing the light beams B emitted by the laser diode 12 to be substantially parallel fluxes; a collective lens 57 for collecting on a light receiving device 58 the light beam B reflected in the optical 1'; and the light receiving device 58 for receiving the collected light beam B to thereby output the detection signal Sdt.

At this time, the drive signal Stst is generated by extracting a low frequency component from the tracking error signal Ste, similarly to the piezoelectric element drive signal Stss.

Next, an operation of the present embodiment is explained.

When recording and reproducing the information onto and from the optical card 1', the motor 46 is driven by a CPU (not shown), and thereby the optical card 1' on the tray 47 is transferred to a left side of FIG. 9B (the optical card transfer direction D), and accordingly the information is recorded and reproduced onto and from the linear information track TR' on the optical card 1'. At this time, a rotation number of the motor 46 is always kept to a constant rotation number corresponding to the transfer speed when recording and reproducing the information.

When the recording and reproducing operation of the information onto and from one information track TR' is ended, the pickup transfer motor 45 is driven through the driver 59 by the drive signal Stp, and thereby the optical pickup 48 is moved to the pickup transfer direction D', and accordingly the information is recorded and reproduced onto and from a next information track TR'.

Figure 9C:
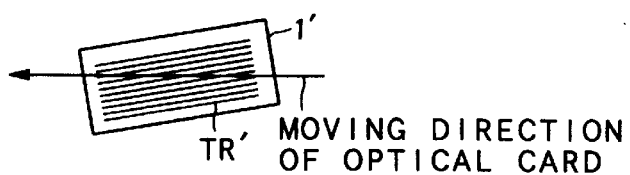
FIG. 9C is a diagram showing a tracking displacement of FIGS. 9A and 9B.

At this time, as mentioned above, if the optical card 1' is placed so as to be located obliquely with respect to a direction in which the information track TR' is formed (that is, the optical card transfer direction D), the tracking displacement which cannot be compensated only by driving the objective lens 2 is brought about at both ends of the information track TR' (refer to FIG. 9C).

Then, in this second embodiment, when the information track TR' is tracked, if the tracking displacement which cannot be compensated only by driving the objective lens 2 is detected by the tracking error signal Ste, the motor 50 is driven through the driver 54 by the drive signal Stst, and thereby the whole tray 55 is rotated within a plane including the information record surface of the optical card 1', and accordingly the placement direction of the optical card 1' (a direction of longer sides of the optical card 1' in FIGS. 9A to 9C) is made coincident with the direction in which the information track TR' is to be formed (the optical card transfer direction D). Further, the optical pickup 48 is moved to the pickup moving direction D', and thereby the light beam B exactly tracks the information track TR'.

That is, if the tracking displacement which cannot be compensated only by driving the objective lens 2 is brought about, the motor 50 is driven to thereby causes the placement direction of the optical card 1' to be coincident with the optical card transfer direction D. Moreover, the light beam B is emitted onto the information track TR' to be tracked which has been moved (rotated) by the rotation of the optical card 1' through the driving operation of the pickup transfer motor 45.

The light beam B is exactly moved on the information track TR' by this rotational operation of the motor 50. Hence, the information can be exactly recorded and reproduced onto and from the information track TR'. Incidentally, it is enough that at least one tracking control is performed by the motor 50 while the light beam B is tracking one information track TR'.

Figure 10A:
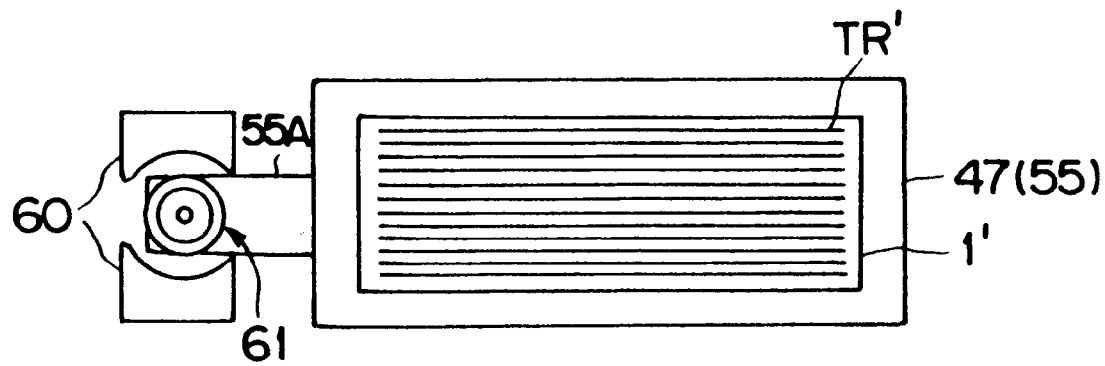
FIG. 10A is a plan view showing a tracking control mechanism of a shaft sliding type as one of the reciprocating types in the second embodiment.

As a mechanism for rotating the tray 55, besides the mechanism using the motor 50 shown in FIGS. 9A to 9C, it may be implemented such that an arm 55A is formed at the tray 55 as shown in FIG. 10A, a coil 61 fixed on the arm 55A is mounted in a magnetic circuit 60, and then the drive signal Stst is inputted to the coil 61, and thereby the tray 55 is rotated.

Figure 10B:
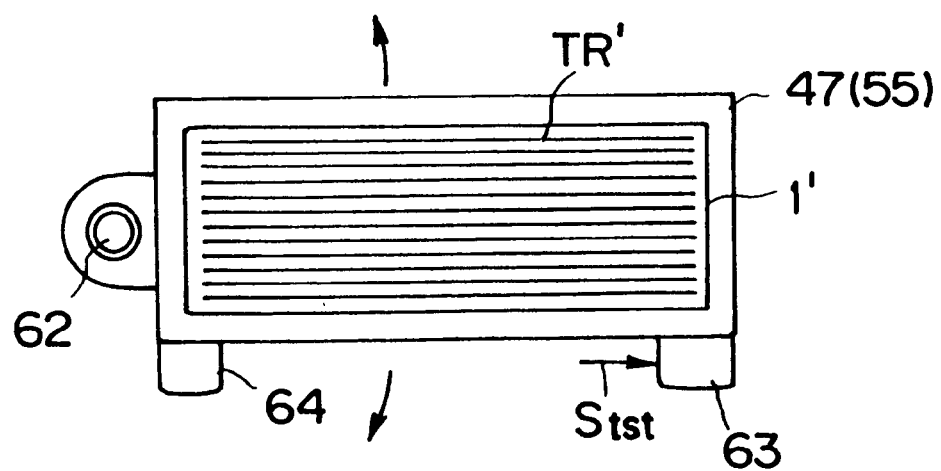
FIG. 10B is a plan view showing a tracking control mechanism using a piezoelectric element as one of the reciprocating types in the second embodiment.

Alternatively, as shown in FIG. 10B, a mechanism for rotating the tray 55 may be implemented such that the tray 55 is rotatably supported by a shaft 62, a piezoelectric element 63 is fixed on one side of the tray 55 opposite to the shaft 62, and then the drive signal Stst is applied to the piezoelectric element 63 so as to cause the deviation thereof, and thereby the tray 55 is rotated in a direction shown by arrows of FIG. 10B. At this time, one side of the tray 55 where the shaft 62 is disposed may be supported by a supporter 64 made of a deformable rubber and the like.

According to each of the rotating mechanisms shown in FIGS. 9A to 10B, since the tray 55 is rotated as the drive signal Stst is applied to the driver 50, the coil 61 or the piezoelectric element 63, the constitution of the apparatus can be simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for optically recording and reproducing information onto and from an optical record medium having an information record surface on which a plurality of circular arc tracks, on each of which the information is recorded and from each of which the information is reproduced, are arranged such that centers of the circular arc tracks are arranged in a straight line direction, said apparatus comprising:

a rotatable optical system for emitting a light beam onto the circular arc track of said optical record medium which is being moved straight in the straight line direction, while being rotated with an rotational axis perpendicular to the information record surface;

a straight moving device for relatively moving said rotatable optical system and said optical record medium to each other in the straight line direction such that the information record surface which is being relatively moved in the straight line direction is kept in one plane;

a detecting device for detecting a displacement amount from the circular arc track at an irradiated position on the information record surface of the light beam, on the basis of a reflection light from the circular arc track of the light beam, and outputting a displacement amount signal indicating the detected displacement amount;

a perpendicularly moving device for relatively moving said optical record medium and said rotatable optical system to each other in a direction, which is substantially in parallel to the one plane and is substantially perpendicular to the straight line direction such that the irradiated position approaches the circular arc track, on the basis of the outputted displacement amount signal; and a recording and reproducing device for recording and reproducing the information onto and from said optical record medium by use of the light beam emitted to the circular arc track.

2. An apparatus according to claim 1, wherein said perpendicularly moving device fixes a position of the rotational axis of said rotatable optical system, and further moves said optical record medium perpendicularly to the straight line direction on the basis of the outputted displacement amount signal.

3. An apparatus according to claim 2, wherein said perpendicularly moving device comprises a piezoelectric element for moving said optical record medium perpendicularly to the straight line direction on the basis of the outputted displacement amount signal.

4. An apparatus according to claim 2, wherein said perpendicularly moving device comprises:

a yoke including a perpendicular portion extending perpendicularly to the straight line direction; and a coil, which is fixed on the perpendicular portion of said yoke and to which the outputted displacement amount signal is supplied, for moving said optical record medium along the perpendicular portion of said yoke on the basis of the outputted displacement amount signal.

5. An apparatus according to claim 2, wherein said perpendicularly moving device comprises:

a first gear fixed on a main body of said optical record medium;

a second gear engaged with said first gear; and a motor, to which the outputted displacement amount signal is supplied, for driving said second gear so as to move said optical record medium perpendicularly to the straight line direction through said first gear on the basis of the outputted displacement amount signal.

6. An apparatus according to claim 2, wherein said perpendicularly moving device comprises:

an arm fixed on a main body of said optical record medium;

a rotor to which said arm is rotatably connected and which has a coil to which the outputted displacement amount signal is supplied;

a magnetic circuit, in which the coil of said rotor is mounted, for rotating said rotor so as to move said optical record medium through said arm on the basis of the outputted displacement amount signal.

7. An apparatus according to claim 2, wherein said perpendicularly moving device comprises:

a yoke including a perpendicular portion extending perpendicularly to the straight line direction; and a coil, which is movably wrapped around the perpendicular portion of said yoke and is fixed on a main body of said optical record medium and to which the outputted displacement amount signal is supplied, for moving said optical record medium along the perpendicular portion of said yoke on the basis of the outputted displacement amount signal.

8. An apparatus for optically recording and reproducing information onto and from an optical record medium having an information record surface on which a plurality of straight line tracks, on each of which the information is recorded and from each of which the information is reproduced, are arranged in parallel to each other such that all of the straight line tracks are directed in a straight line direction, said apparatus comprising:

an optical system for emitting a light beam onto the straight line track of said optical record medium which is being moved straight in the straight line direction;

a first moving device for relatively moving said optical system and said optical record medium to each other in the straight line direction for each of the straight line tracks such that the information record surface which is being relatively moved in the straight line direction is kept in one plane;

a detecting device for detecting a displacement amount from the straight line track at an irradiated position on the information record surface of the light beam, on the basis of a reflection light from the straight line track of the light beam, and outputting a displacement amount signal indicating the detected displacement amount;

a second moving device for relatively moving said optical record medium and said optical system to each other in a direction, which is substantially in parallel to the one plane and is substantially perpendicular to the straight line direction such that the irradiated position approaches the straight line track, on the basis of the outputted displacement amount signal; and a recording and reproducing device for recording and reproducing the information onto and from said optical record medium by use of the light beam emitted to the straight line track.

9. An apparatus according to claim 8, wherein said second moving device comprises a motor, to which the displacement amount signal is supplied, for rotating said optical record medium with respect to said optical system on the basis of the outputted displacement amount signal.

10. An apparatus according to claim 8, wherein said second moving device comprises:

an arm fixed on one side of said optical record medium;

a coil, which is fixed on said arm and to which the displacement amount signal is supplied; and a magnetic circuit in which said coil is mounted, for rotating said optical record medium through said arm on the basis of the outputted displacement amount signal.

11. An apparatus according to claim 8, wherein said second moving device comprises:

a shaft fixed on one side of said optical record medium; and a piezoelectric element, which is fixed on the other side of said optical record medium and to which the displacement amount signal is supplied, for rotating said optical record medium around said shaft on the basis of the outputted displacement amount signal.

* * * * *